(12) United States Patent
Sato et al.

(10) Patent No.: US 7,798,576 B2
(45) Date of Patent: Sep. 21, 2010

(54) BRAKE CONTROL DEVICE FOR VEHICLE

(75) Inventors: Takashi Sato, Okazaki (JP); Hiroaki Niino, Toyota (JP)

(73) Assignee: Advics Co., Ltd., Aichi-pref. (JP)

( * ) Notice: Subject to any disclaimer, the term of this patent is extended or adjusted under 35 U.S.C. 154(b) by 792 days.

(21) Appl. No.: 11/714,208

(22) Filed: Mar. 6, 2007

(65) Prior Publication Data

US 2007/0210648 A1    Sep. 13, 2007

(30) Foreign Application Priority Data

Mar. 13, 2006    (JP)    .............................. 2006-067438

(51) Int. Cl.
*B60T 13/16*    (2006.01)
(52) U.S. Cl. .............................. 303/10; 303/11; 303/20; 303/113.2; 303/115.4; 303/116.1; 303/119.1; 303/149; 303/150; 303/155; 701/70; 701/71; 701/78; 701/80
(58) Field of Classification Search .................... 303/10, 303/11, 20, 113.2, 115.4, 116.1, 119.1, 149, 303/150, 155; 701/70, 71, 78, 80
See application file for complete search history.

(56) References Cited

U.S. PATENT DOCUMENTS

| 4,969,696 | A | 11/1990 | Yogo et al. |
| 5,257,192 | A | 10/1993 | Masaki |
| 5,924,777 | A | 7/1999 | Kamikado |
| 6,113,197 | A | 9/2000 | Kuroki et al. |
| 6,234,588 | B1 | 5/2001 | Sawada |
| 7,445,298 | B2 * | 11/2008 | Niino et al. .................... 303/11 |
| 7,469,974 | B2 * | 12/2008 | Maki et al. .................... 303/11 |
| 7,621,602 | B2 * | 11/2009 | Sato et al. ..................... 303/11 |
| 7,621,603 | B2 * | 11/2009 | Sato et al. ..................... 303/11 |
| 2007/0210642 | A1 * | 9/2007 | Niino et al. .................... 303/11 |

FOREIGN PATENT DOCUMENTS

| DE | 40 21 993 C2 | 2/2003 |
| JP | A-10-203338 | 8/1998 |

OTHER PUBLICATIONS

Office Action dated Apr. 12, 2010 from the German Patent and Trade Mark Office in the corresponding patent application No. 10 2007 000 136.5-21 (English translation enclosed).

* cited by examiner

*Primary Examiner*—Robert A Siconolfi
*Assistant Examiner*—Mariano Sy
(74) *Attorney, Agent, or Firm*—Posz Law Group, PLC

(57) ABSTRACT

In an ABS control, a vehicle brake control device detects a sudden change road in which a friction coefficient changes suddenly from a high value to a lower value and controls, based on the detection of the sudden change road, the currents to be supplied to a first and a second electrical motor in a first manner or a second manner, wherein in the first manner the currents are controlled so that the first and second electrical motors would eventually stop rotating if the motor control portion kept controlling the currents in the first manner for a sufficiently long time, and in the second manner the currents are controlled so that the first and second electrical motors would eventually start rotating in a reverse direction if the motor controlling portion kept controlling the currents in the second manner for a sufficiently long time.

10 Claims, 11 Drawing Sheets

|  | NORMAL BRAKING | ABNORMAL BRAKING |
|---|---|---|
| SNO1 | ON (CLOSED) | OFF (OPEN) |
| SNO2 | ON (CLOSED) | OFF (OPEN) |
| SWC1 | ON (OPEN) | OFF (CLOSED) |
| SWC2 | ON (OPEN) | OFF (CLOSED) |
| SLFR | DUTY | OFF (OPEN) |
| SLRL | DUTY | OFF (OPEN) |
| SLFL | DUTY | OFF (OPEN) |
| SLRR | DUTY | OFF (OPEN) |
| SCSS | ON (OPEN) | OFF (CLOSED) |
| FIRST & SECOND MOTOR | ON | OFF |

FIG. 6

BRAKE CONTROL DEVICE FOR VEHICLE

CROSS REFERENCE TO RELATED APPLICATION

This application is based on and incorporates herein by reference Japanese patent application No. 2006-67438 filed on Mar. 13, 2006.

FIELD OF THE INVENTION

The present invention relates to a vehicle brake control device which generates pressures (hereinafter referred to as W/C pressures) in wheel cylinders (hereinafter referred to as W/Cs) by causing pumps to apply pressures.

BACKGROUND OF THE INVENTION

In Japanese Patent Publication No. H10-203338, a brake-by-wire vehicle brake control device is proposed which has four pumps respectively for the four wheels of a vehicle. Two of the four pumps are located in a common conduit system for two of the four wheels and are driven by a common electrical motor. The other two of the four pumps are located in another common conduit system for the other two of the four wheels and are driven by another common electrical motor.

The above vehicle brake control device uses each of the electrical motors to drive two pumps in a conduit system. In executing an anti-lock brake (hereinafter referred to as ABS) control, optimum rotational speeds for the electrical motors depend on a friction coefficient μ of a road on which the vehicle is traveling. Therefore, it is desirable to determine target rotational speeds of the electrical motors based on the friction coefficient μ.

FIG. 11 includes graphs showing a relation between a W/C pressure increase rate and a target rotational speed of an electrical motor in a pressure increase mode of the ABS control and a relation between a W/C pressure decrease rate and a target rotational speed of the electrical motor in a pressure decrease mode of the ABS control. In each of the graphs, the relation covers both situations that the vehicle is traveling on a road with a high friction coefficient μ and that the vehicle is traveling on a road with a low friction coefficient μ. Hereinafter, the road with a high friction coefficient μ and the road with a low friction coefficient μ are referred to as a high friction road and a low friction road, respectively.

As shown in the drawing, a high pressure increase rate is required at the high friction road. Therefore, it is desired at the high friction road that the electrical motor achieves a high rotational speed which is equal to or more than a rotational speed Na1 in FIG. 11 and accordingly satisfies the required pressure increase rate. On the other hand, a high pressure decrease rate is required at the high friction road because it is necessary to decrease the W/C pressure rapidly from a high pressure when a slip ratio of the corresponding wheel is large. The high pressure decrease rate puts an upper limit (a rotational speed Na2 in FIG. 11) to the rotational speed of the electrical motor. It is therefore desirable to adjust the rotational speed of the electrical motor at the high friction road so that the adjusted rotational speed is within a range between the rotational speed Na1 and the rotational speed Na2.

At the low friction road, the pressure increase speed is not required to be as high as at the high friction road. Therefore, it is desirable that the rotational speed of the electrical motor is equal to or more than a rotational speed Nb1 in FIG. 11 and accordingly satisfies the lower pressure increase rate. When the slip ratio is high at the low friction road, the W/C pressure is decreased from a lower pressure. However, the high pressure decrease rate is still required because the decrease rate of the W/C pressure should be high enough. The high pressure decrease rate puts an upper limit (a rotational speed Nb2 in FIG. 11) to the rotational speed of the electrical motor. It is therefore desirable to adjust the rotational speed of the electrical motor at the high friction road so that the adjusted rotational speed is within a range between the rotational speed Nb1 and the rotational speed Nb2.

However, if the vehicle is traveling on the sudden change road in which the friction coefficient drastically changes from a higher value to a lower value, it is impossible to change the rotational speeds of the electrical motors immediately from the rotational speeds suitable for the high friction road to the rotational speeds suitable for the low friction road, because the rotational speeds suitable for the high friction road significantly differ from the rotational speeds suitable for the low friction road. Therefore, a sufficient deceleration of the vehicle cannot be obtained in the ABS control and a suitable ABS control is accordingly difficult to achieve.

SUMMARY OF THE INVENTION

It is therefore an object of the present invention to provide a vehicle brake control device which can immediately change a rotational speed of an electrical motor to a suitable speed at a sudden change road in which a fiction coefficient suddenly changes, for example, from a high value to a low value and can accordingly execute the suitable ABS control at the sudden change road.

In a vehicle brake control device according to an aspect of the present invention, the control means includes: a first calculating portion for calculating target wheel cylinder pressures corresponding to an operation amount detected by an operation amount sensor when the operation amount sensor detects that a brake operating member is operated; a second calculating portion for calculating slip ratios of front wheels and the rear wheels; an ABS control portion for executing an ABS control based on the slip ratios calculated by the second calculating portion; a friction estimating portion for estimating friction coefficients of sections of a road on which the front wheels and the rear wheels are located, respectively, and a motor control portion (#100h, 100i). The motor control portion is for: determining target rotational speeds of a first and a second electrical motor based on the target wheel cylinder pressures calculated by the first calculating portion; obtaining information as to whether the ABS control is executed from the ABS control portion and information on the friction coefficients from the friction estimating portion; determining, while the ABS control is executed, the target rotational speeds of the first and second electrical motors based on the friction coefficients; and controlling current values of currents to be supplied to the first and second electrical motors so that the first and second electrical motors rotates at the determined target rotational speeds. In addition, in the ABS control, the motor control portion: detects, based on the obtained information on the friction coefficients from the friction estimating portion, that the vehicle is traveling on a sudden change road in which a friction coefficient changes suddenly from a high value higher than a threshold coefficient to a lower value lower than the threshold coefficient; and performs a motor brake control for controlling, based on the detection of the sudden change road, the currents to be supplied to the first and second electrical motors in a first manner or a second manner in order to change rotational speeds of the first and second electrical motors from high target rotational speeds for a high friction section of the sudden change road having the friction coefficient of the high value to low target rotational speeds for a low friction section of the sudden change road having the friction coefficient of the low value, wherein in the first manner the currents are controlled so that the first and second electrical motors would eventually stop rotating, and in the second manner the currents are controlled so that the first and second electrical motors would eventually keep rotating in a reverse direction.

As described above, in the ABS control, the motor control portion of the vehicle brake control device detects the sudden change road in which a friction coefficient changes suddenly from a high value to a lower value and controls, based on the detection of the sudden change road, the currents to be supplied to the first and second electrical motors in a first manner or a second manner, wherein in the first manner the currents are controlled so that the first and second electrical motors would eventually stop rotating, and in the second manner the currents are controlled so that the first and second electrical motors would eventually start rotating in a reverse direction.

Thus, it is possible to change the rotational speeds of the first and second electrical motors from the high rotational speeds suitable for the high friction section to the low rotational speeds suitable for the low friction section. Therefore, it is possible to achieve a sufficient deceleration of the vehicle in the ABS control even if the vehicle is traveling on the sudden change road. As a consequence, the vehicle brake control device executes the ABS control in the suitable manner.

For example, the motor control portion may determine whether the vehicle is traveling on the sudden change road based on whether at least one of differences between the high target rotational speeds and the low target rotational speeds is larger than a threshold difference.

The brake control device may also include a third calculating portion for calculating pressure increase rates of wheel cylinder pressures of the wheel cylinders based on the friction coefficients estimated by the friction estimating portion, and a fourth calculating portion for calculating pressure decrease rates of wheel cylinder pressures of the wheel cylinders based on the friction coefficients estimated by the friction estimating portion. In this case, the motor control portion may: obtain information on the pressure increase speeds and pressure decrease speeds from the third calculating portion and the fourth calculating portion; and use the information on the obtained pressure increase speeds and the pressure decrease speeds as the information on the friction coefficients from the friction estimating portion, in determining, while the ABS control is executed, the target rotational speeds of the first and second electrical motors depending on a friction coefficient on which the vehicle is traveling.

Thus, the motor control portion can obtain the information on the pressure increase speeds and the pressure decrease speeds from the third and the fourth calculating portions; and use the information on the obtained pressure increase speeds and pressure decrease speeds as the information on the friction coefficients from the friction estimating portion, in determining, while the ABS control is executed, the target rotational speeds of the first and second electrical motors depending on a friction coefficient on which the vehicle is traveling.

The motor control portion may determine duration of the motor brake control based on the differences between the high target rotational speeds and the low target rotational speeds.

By determining the duration of the motor brake control based on the differences between the high target rotational speeds and the low target rotational, it is possible to properly adjust a period necessary for decreasing the rotational speeds of the first and second electrical motors.

In another aspect of the present invention, the motor control portion detects, based on the obtained information on the slip ratios from the second calculating portion, that the vehicle is traveling on a sudden change road; and performs a motor brake control for controlling, based on the detection of the sudden change road, the currents to be supplied to the first and second electrical motors in a first manner or a second manner in order to change rotational speeds of the first and second electrical motors, wherein in the first manner the currents are controlled so that the first and second electrical motors would eventually stop rotating, and in the second manner the currents are controlled so that the first and second electrical motors would eventually starts rotating in a reverse direction.

Since the slip ratios can be used to detect the sudden change road, it is possible to execute the motor brake control based on the slip ratios so that the first and second electrical motors rotate at optimum rotational speeds.

For example, the motor control portion may execute the motor brake control in any case of that at least one of the slip ratios exceeds a threshold slip ratio, that at least one of change rates of the slip ratios exceeds a threshold rate, and that at least one of the slip ratios changes from a ratio below a threshold ratio to a ratio above a threshold ratio quickly.

In addition, the first electrical motor and the second electrical motor may be brushless motors.

BRIEF DESCRIPTION OF THE DRAWINGS

The invention, together with additional objective, features and advantages thereof, will be best understood from the following description, the appended claims and the accompanying drawings. In the drawings:

FIG. 6 is a schematic diagram showing operating states of portions in the vehicle brake control device in normal braking and in an abnormal situation;

DETAILED DESCRIPTION OF THE EMBODIMENTS

Figure 1:
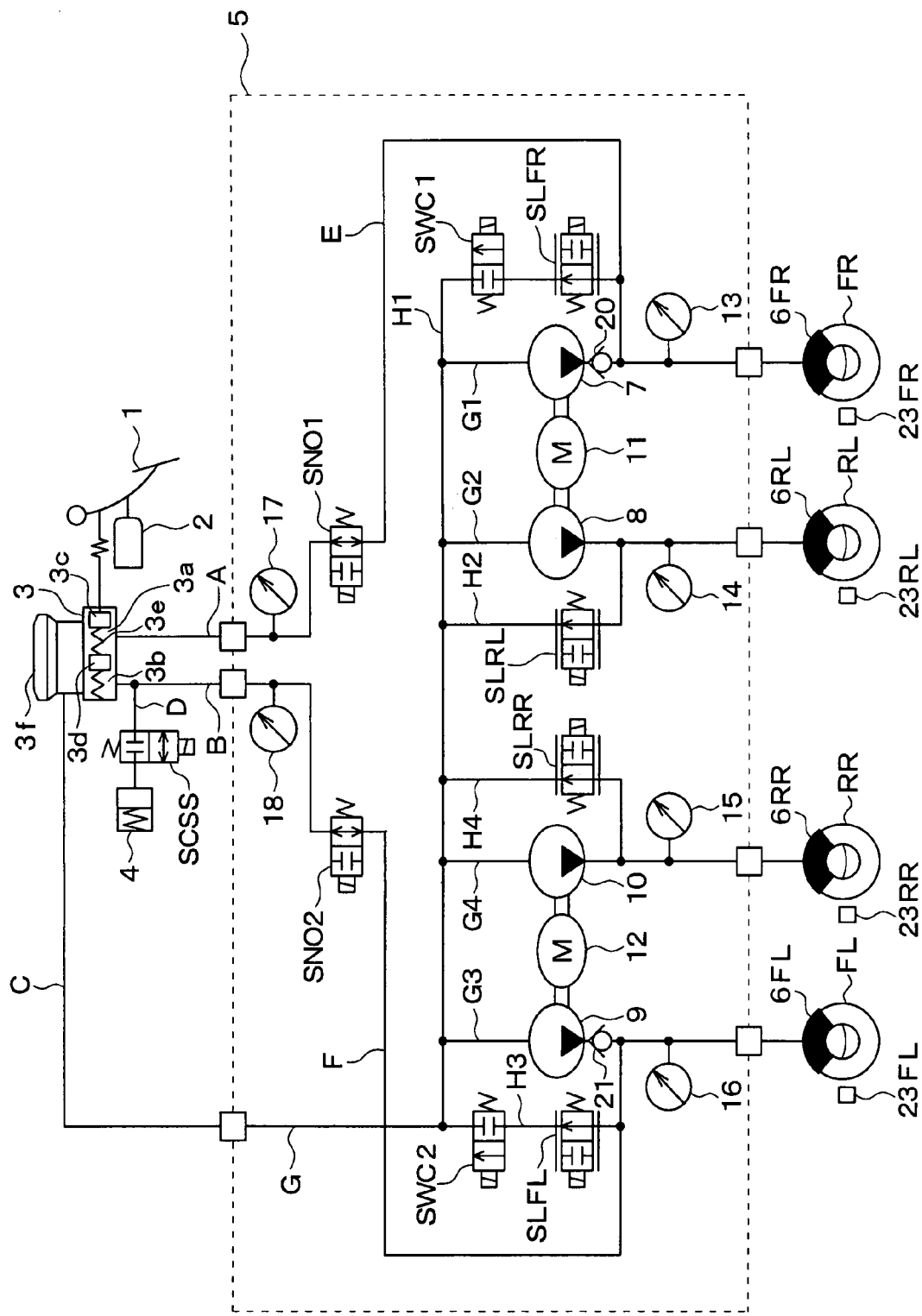
FIG. 1 is a diagram showing a hydraulic circuit configuration of a vehicle brake control device according to the first embodiment of the present invention.

Embodiments of the present invention will be described below with reference to the drawings. In the embodiments below, identical reference symbols are used in the drawings to represent identical or equivalent elements.

First Embodiment

Vehicle brake control device according to a first embodiment of the present invention is applied to a vehicle with an X-shaped hydraulic circuit including two conduit systems, one of which serves the right front wheel and the left rear wheel and the other of which serves the left front wheel and the right rear wheel.

Figure 2:
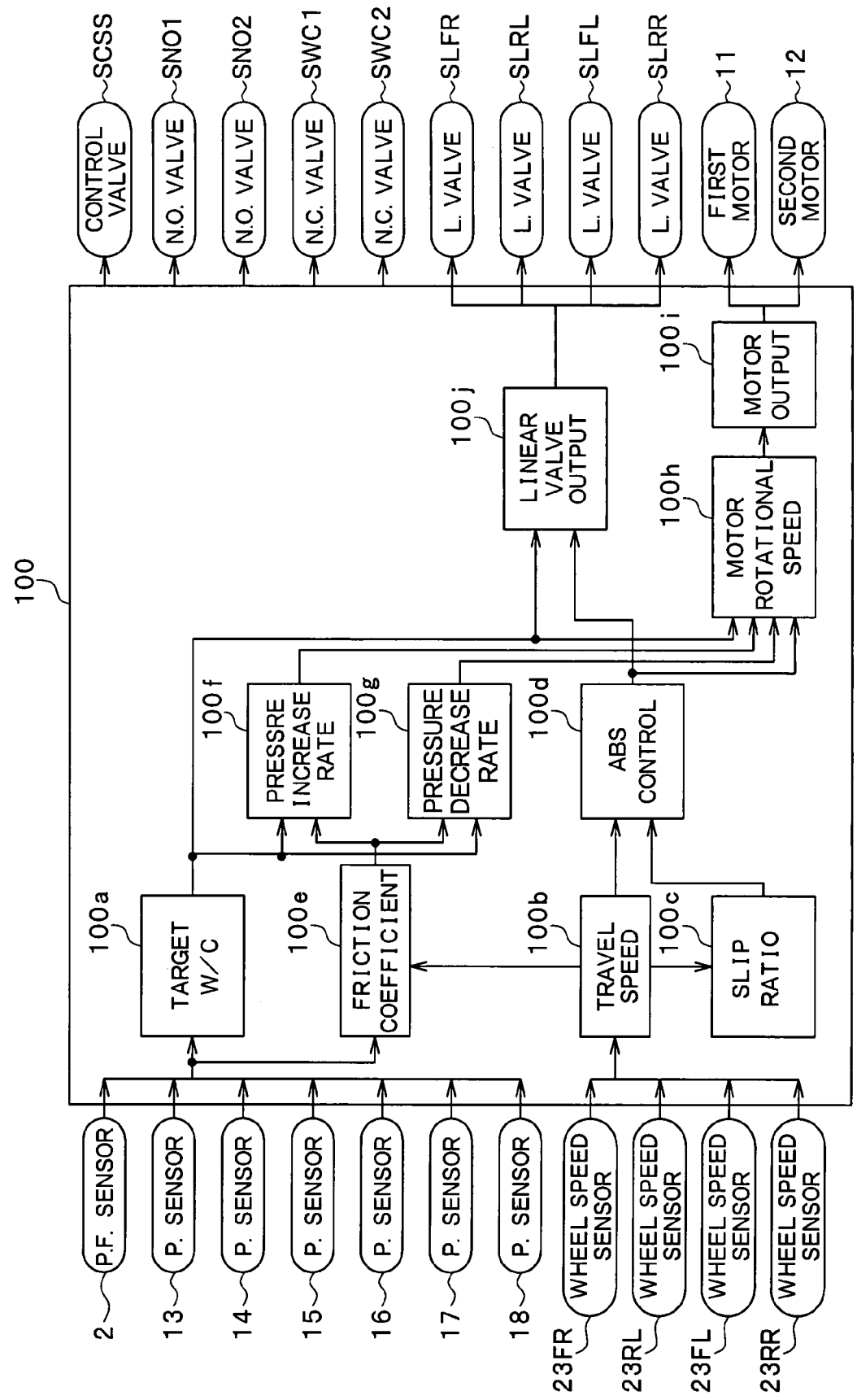
FIG. 2 is a block diagram showing input-output relationships of signals of a brake ECU that controls a control system of the vehicle brake control device shown in FIG. 1.

As shown in FIG. 1, the vehicle brake control device includes a brake pedal 1, a depression force sensor 2, a master cylinder (hereinafter referred to as an M/C) 3, a stroke control valve SCSS, a stroke simulator 4, a brake fluid pressure control actuator 5, and wheel cylinders (hereinafter referred to as W/Cs) 6FL, 6FR, 6RL, 6RR, as well as a brake ECU 100 shown in FIG. 2.

When the brake pedal 1, which is an example of a brake operating member, is depressed by a driver, the depression force applied to the brake pedal 1 is inputted to the depression force sensor 2, and a detection signal corresponding to the applied depression force is outputted by the depression force sensor 2. The detection signal is inputted to the brake ECU 100, and thus the depression force applied to the brake pedal 1 is detected by the brake ECU 100. Although the depression force sensor 2 is used as an example of an operation amount sensor for detecting an amount of operation to the brake operating member, a stroke sensor or the like may also be used as another example of the operation amount sensor. The vehicle brake control device may also be configured such that it detects a state of operation of the brake pedal 1 based on detection signals from a stroke sensor and pressure sensors 17 and 18, which detect an M/C pressure described later.

A push rod or the like is connected with the brake pedal 1 and transmits the applied depression force to the M/C 3. When the push rod or the like is pushed, the M/C pressure is generated in a primary chamber 3a and a secondary chamber 3b, which are provided in the M/C 3.

The M/C 3 includes a primary piston 3c and a secondary piston 3d, which form and demarcates the primary chamber 3a and the secondary chamber 3b. The primary piston 3c and the secondary piston 3d receive an elastic force of a spring 3e, thereby return the brake pedal 1 to its initial position when the brake pedal 1 becomes free from the depression force.

The vehicle brake control device also includes brake conduits A and B, which extend respectively from the primary chamber 3a and the secondary chamber 3b of the M/C 3 to the brake fluid pressure control actuator 5.

The M/C 3 also includes a master reservoir 3f. While the brake pedal 1 is in its initial position, the master reservoir 3f is connected with the primary chamber 3a and the secondary chamber 3b via channels not shown in FIG. 1, supplies brake fluid to the M/C 3, and stores any surplus brake fluid.

A brake conduit C directly extends from the master reservoir 3f to the brake fluid pressure control actuator 5.

The stroke simulator 4 is connected with a brake conduit D extending to the brake conduit B and receives the brake fluid in the secondary chamber 3b. The stroke control valve SCSS, a type of normally-closed two-position valve, is provided in the brake conduit D and controls open and closed states of the brake conduit D. A normally closed two-position valve opens a path to which it is installed while electrical power is supplied to it, and closes the path while electrical power is not supplied to it. The configuration allows the stroke control valve SCSS to control the flow of brake fluid to the stroke simulator 4.

The brake fluid pressure control actuator 5 is configured as described below.

The actuator 5 includes a brake conduit E which is connected with the brake conduit A so that the primary chamber 3a is connected via the brake conduit E with the W/C (first front wheel W/C) 6FR, which corresponds to a front wheel FR. A first normally-open valve (a first control valve) SNO1 is located in the brake conduit E. The first normally-open valve SNO1 is a two-position valve that opens a path to which it is installed while electrical power is not supplied to it, and closes the path while electrical power is supplied to it. The first normally-open valve SNO1 controls the open and closed states of the brake conduit E.

The actuator 5 also includes a brake conduit F which is connected with the brake conduit B so that the secondary chamber 3b is connected via the brake conduit F with the W/C (second front wheel W/C) 6FL, which corresponds to a front wheel FL. A second normally-open valve (a second control valve) SNO2 is located in the brake conduit F. The second normally-open valve SNO2 is a two-position valve that opens a path to which it is installed while electrical power is not supplied to it, and closes the path while electrical power is supplied to it. The second normally-open valve SNO2 thus controls the open and closed states of the brake conduit F.

The actuator also includes a brake conduit G which is connected with the brake conduit C that extends from the master reservoir 3f. The brake conduit G branches into four brake conduits called brake conduits G1, G2, G3, and G4 which are respectively connected with the W/Cs 6FR, 6RL, 6FL, and 6RR, wherein the W/Cs 6FL and 6FR respectively correspond to the front wheels FL and FR, and the W/Cs (first and second rear wheel W/Cs) 6RL and 6RR respectively correspond to the rear wheels RL and RR. Note that the brake conduit G includes the brake conduits G1 to G4.

The brake conduits G1 to G4 are respectively provided with pumps (first to fourth pumps) 7, 8, 9, 10. The pumps 7 to 10 are configured as, for example, trochoid pumps which are effective for quietness. The pumps 7 and 8 are driven by a first electrical motor 11, and the pumps 9 and 10 are driven by a second electrical motor 12. Each of the first motor 11 and the second motor 12 may be of any kind of motor, but a brushless motor is preferable because it increases its rotational speed quickly after it starts rotating.

Brake conduits H1, H2, H3, and H4 are located in parallel with the pumps 7 to 10, respectively.

A first normally-closed valve SWC1 and a first linear valve SLFR are located in series in the brake conduit H1 connected in parallel with the pump 7. The first normally-closed valve SWC1 is located closer than the linear valve SLFR is to the intake side (upstream side) of the pump 7, and the first linear valve SLFR is located closer than the first normally-closed valve SWC1 is to the discharge side (downstream side) of the pump 7. In other words, a return flow returning through the brake conduit H1 to the master reservoir 3f can be controlled by using the first normally-closed valve SWC1.

A second linear valve SLRL is located in the brake conduit H2 connected in parallel with the pump 8.

A second normally-closed valve SWC2 and a third linear valve SLFL are located in series in the brake conduit H3 connected in parallel with the pump 9. The second normally-closed valve SWC2 is located closer than the third linear valve SLFL is to the intake side (upstream side) of the pump 9, and the third linear valve SLFL is located closer than the second normally-closed valve SWC2 is to the discharge side (downstream side) of the pump 9. In other words, a return flow returning through the brake conduit H3 to the master reservoir 3f can be controlled by using the second normally-closed valve SWC2.

A fourth linear valve SLRR is located in the brake conduit H4 connected in parallel with the pump 10.

A first pressure sensor 13, a second pressure sensor 14, a third pressure sensor 16, and a fourth pressure sensor 15 are respectively located in the brake conduits G1 to G4, between the pumps 7 to 10 and the W/Cs 6FR to 6RR, and are configured in such a way that the pressures in each of the W/Cs can be detected. The pressure sensors 17 and 18 are respectively located in the brake conduits E and F on the upstream sides (the M/C 3 sides) of the first and second normally-open valves SNO1, SNO2, and are configured in such a way that an M/C pressure that is generated in the primary chamber 3a and the secondary chamber 3b of the M/C 3 can be detected. The detection signals from the pressure sensors 13 to 18 are inputted to the brake ECU 100, as shown in FIG. 2.

Check valves 20 and 21 are respectively located in the discharge port of the pump 7 which pressurizes the W/C 6FR, and in the discharge port of the pump 9 which pressurizes the W/C 6FL. The check valves 20 and 21 are provided to prevent brake fluid from flowing respectively from the W/Cs 6FR and 6FL to the pumps 7 and 9.

In the vehicle brake control device, a first conduit system includes a hydraulic circuit (a first auxiliary brake conduit) that connects the primary chamber 3a with the W/C 6FR via the brake conduit A and the brake conduit E. The first conduit system also includes a hydraulic circuit (a first main brake conduit) that connects the master reservoir 3f and the W/Cs 6FR and 6RL via the brake conduits C G, G1, and G2. The first conduit system further includes hydraulic circuits (first and second pressure-adjusting brake conduits) having the brake conduits H1 and H2, which are connected in parallel with the pumps 7 and 8, respectively.

Also in the vehicle brake control device, a second conduit system includes a hydraulic circuit (a second auxiliary brake conduit) that connects the secondary chamber 3b and the W/C 6FL via the brake conduit B and the brake conduit F. The second conduit system also includes a hydraulic circuit (a second main brake conduit) that connects the master reservoir 3f and the W/Cs 6FL and 6RR via the brake conduits C, G, G3, and G4. The second conduit system further includes hydraulic circuits (third and fourth pressure-adjusting brake conduits) having the brake conduits H3 and H4, which are connected in parallel with the pumps 9 and 10, respectively.

The vehicle brake control system also includes wheel speed sensors 23FR, 23RL, 23FL, and 23RR respectively for detecting wheel speeds of the wheels FR, RL, FL, and RR. A wheel speed of a wheel is the product of a rotational speed of the wheel and a circumference of the wheel. Detection signals from the wheel speed sensors 23FR to 23RR are inputted into the brake ECU 100.

The brake ECU 100 includes a well-known microcomputer which has a CPU, a ROM, a RAM, and an I/O. The brake ECU 100 executes, according to programs stored in the ROM and the like, several kinds of brake control processes including a process for emergency braking such as an ABS control process. The brake ECU 100 includes semiconductor switching elements (not shown) for controlling ON/OFF states of power supply lines for the control valves SCSS, SNO1, SNO2, SWC1, SWC2, SLFR, SLRL, SLFL, SLRR, the first motor 11, and the second motor 12. ON/OFF of the power supply to the valves and the motors and an average of current values for the valves and the motors can be controlled by, for example, using the ON/OFF control of the semiconductor switching elements.

More specifically, the brake ECU 100 includes a target W/C pressure calculating portion 100a, a travel speed calculating portion 100b, a slip ratio calculating portion 100c, an ABS controlling portion 100d, a friction coefficient estimating portion 100e, a pressure increase rate calculating portion 100f, a pressure decrease rate calculating portion 100g, a motor rotational speed calculating portion 100h, a motor output adjusting portion 100i, a linear valve output adjusting portion 100j, and the like.

The target W/C pressure calculating portion 100a calculates target W/C pressures respectively for the four wheels. The target W/C pressures are pressures required to generate a target brake force. More specifically, the portion 100a calculates, based on the detection signal from the depression force sensor 2, a physical quantity of a depression force corresponding to the amount of the operation to the brake pedal 1. The amount of the operation to the brake pedal 1 will be referred to as a pedaling amount. Then the portion 100a calculates the target W/C pressures corresponding to the physical quantity. The target W/C pressures are proportional to the pedaling amount and is determined based on a mapping dataset or a formula which indicates a relation between the pedaling amount and values for a target W/C pressure. The mapping dataset may be stored in a storage device.

The travel speed calculating portion 100b calculates the wheel speeds and wheel accelerations of the wheels FR to RR based on the detection signals from the wheel speed sensors 23FR to 23RR. The wheel accelerations can be determined as time derivatives of the wheel speeds. The portion 100b then calculates a speed of the body of the vehicle based on the calculated wheel speeds. The speed of the body of the vehicle will be referred to as a body speed. Methods for calculating the body speed is not described in detail because it is known well.

The slip ratio calculating portion 100c calculates slip ratios of the wheels FR to RR. A slip ratio of a wheel is calculated as a deviation of the wheel speed of the wheel from the calculated body speed. More specifically, each of the slip ratios is calculated as a speed difference divided by the body speed, where the speed difference is a difference of a corresponding wheel speed from the body speed.

The ABS controlling portion 100d determines a time to start decreasing each of W/C pressures at the W/Cs 6FL to 6RR based on the result of comparison between a reference slip ratio and each of the slip ratios calculated by the slip ratio calculating portion 100c. The ABS controlling portion 100d also determines a time to increase or maintain each of W/C pressures at the W/Cs 6FL to 6RR based on whether each of the wheel speeds is catching up with the body speed, that is, whether each of the wheel accelerations has a positive value. The ABS controlling portion 100d also executes the ABS control process in a conventional manner, and a detailed description of the ABS control process is omitted.

The friction coefficient estimating portion 100e is for estimating friction coefficients μ of sections of a road on each of which one of the wheels FR to RR is moving. For example, the portion 100e estimates each of the friction coefficients μ based on a change of a W/C pressure at a corresponding W/C detected by a corresponding pressure sensor and on a change of a wheel speed of a corresponding wheel calculated by the travel speed calculating portion 100b. The friction coefficient estimating portion 100e can use any of various known methods for estimating the friction coefficients μ.

The pressure increase rate calculating portion 100f calculates pressure increase rates of the W/Cs 6FR to 6RR. Each of the pressure increase rates is an increase rate (i.e. an increase amount per unit time) of a W/C pressure at a corresponding W/C. The pressure increase rates sometimes indicate normal pressure increase rates for satisfying requirements due to the amount of the operation performed to the brake pedal 1 in the normal braking operation and sometimes indicate ABS pressure increase rates for satisfying requirements in increasing the W/C pressures in the ABS control. The normal pressure increase rates can be calculated, for example, based on change rates of the target W/C pressures calculated by the portion 100a. The ABS pressure increase rates can be calculated, for example, based on the friction coefficients μ estimated by the friction coefficient estimating portion 100e.

The pressure decrease rate calculating portion 10g calculates pressure decrease rates of the W/Cs 6FR to 6RR. Each of the pressure decrease rates is a decrease rate (i.e. a decrease amount per unit time) of a W/C pressure at a corresponding W/C. The pressure decrease rates sometimes indicate normal pressure decrease rates for satisfying requirements due to the amount of the operation performed to the brake pedal 1 in the normal braking operation and sometimes indicate ABS pressure decrease rates for satisfying requirements in decreasing the W/C pressures in the ABS control. The normal pressure decrease rates can be calculated, for example, based on change rates of the target W/C pressures calculated by the portion 100a. The ABS pressure decrease rates can be calculated, for example, based on the friction coefficients μ estimated by the friction coefficient estimating portion 100e.

The motor rotational speed calculating portion 100h calculates target rotational speeds of the first and second motors 11 and 12 based on the W/C pressures calculated by the target W/C pressure calculating portion 100a. The portion 100h determines the target rotational speeds so that they allow the calculated pressure increase rates to be achievable when the W/C pressure is increased and allow the calculated pressure decrease rates to be achievable when the W/C pressure is decreased, both in the normal braking and in the ABS control.

Suppose that the vehicle travels on a sudden change road a friction coefficient of which suddenly changes from a section to another section and that the vehicle moves from a high friction section to a low friction section of the sudden change road. In this case, the portion 100h calculates the target rotational speeds for the high friction road based on the calculated pressure increase speeds and on the calculated decrease speeds for the high friction road and calculates the target rotational speeds for the low friction road based on the calculated pressure increase speeds and on the calculated decrease speeds for the low friction road. Further in this case, changes in the current values for the motors 11 and 12 sometimes cannot afford the difference between the target rotational speeds calculated for the high friction section and the target rotational speeds calculated for the low friction section because the difference is exceedingly large. It is possible to detect whether or not a road on which the vehicle is traveling is the sudden change road based on the changes in the target rotational speeds of the motors 11 and 12.

The motor output adjusting portion 100i controls, based on the result of the calculation of the motor rotational speed calculating portion 100h, currents supplied to the first and second motors 11 and 12. For example the portion 100i controls ON/OFF of the semiconductor switching elements in order to adjust average current values of the currents over an interval. With the control of the portion 100i, the first and second motors 11 and 12 achieve the target rotational speeds calculated by the motor rotational speed calculating portion 100h.

The portion 100i also calculates the change amounts in the target rotational speeds calculated by the portion 100h and makes a determination as to whether the changes are larger than a threshold. When the determination is affirmative, the portion 100i performs a motor brake control in which the first and second motors 11 and 12 receives brake forces so that the rotational speeds of the motors 11 and 12 changes rapidly from those suitable for the high friction section to those suitable for the low friction section. The motor brake control will be described later in detail.

The threshold described above is set to be a value larger than or equal to the maximum value of changes of the rotational speeds of the motors 11 and 12 achieved simply by controlling the current values of the currents to be supplied to the motors 11 and 12 so that the current values change by amount corresponding to the change of the rotational speeds. In other words, the threshold described is set to be a value above which the target rotational speeds calculated by the motor rotational speed calculating portion 100h cannot be achieved simply by controlling the current values for the motors 11 and 12 so that the current values change by amount corresponding to the change of the rotational speeds.

The linear valve output adjusting portion 100j calculates, based on the target W/C pressures or on the result of the operation of the ABS controlling portion 100d, current values for currents to be supplied to the linear valves SLFR to SLRR. The portion 100j then adjusts the currents to the linear valves SLFR to SLRR based on the calculated current values. For example, the portion 100j determines an average of each of the current values in an interval by determining duty factors related to ON/OFF of the currents to the SLFR to SLRR. The portion 100j may control the averages of the current values by controlling ON/OFF of the semiconductor switching elements located in power supply lines to the first to fourth linear valves SLFR to SLRR, so that differential pressures generated at the first to fourth linear valves SLFR to SLRR have values suitable for the calculated target W/C pressures. Each of the differential pressures is a difference in the brake fluid pressure between both ends of its corresponding valve.

The brake ECU 100 also generates the W/C pressures at the W/Cs 6FR to 6RR by outputting control signals (more specifically, control currents) for driving the control valves SCSS, SNO1, SNO2, SWC1, and SWC2, in addition to controlling the currents to the first and second motors 11 and 12 by means of the motor output adjusting portion 100i and controlling the currents to the first to fourth linear valves SLFR to SLRR by means of the linear valve output adjusting portion 100j. The brake ECU 100 also detects the generated W/C pressures and the M/C pressure based on the detection signals from the sensors 13 to 18 and accordingly loops back an actual brake force generated at the wheels to a control for achieving a target brake force.

The signals for driving the brake ECU 100, the control valves SCSS, SNO1, SNO2, SWC1, SLFR, SLRL, SLFL, SLRR, the first motor 11, and the second motor 12 are supported by power supply from a on-board battery (not shown).

Hereinafter, a detailed description will be given of a method for changing rapidly the rotational speed of the motors 11 and 12 from the rotational speeds suitable for the high friction section to the rotational speeds suitable for the low friction section with reference to FIGS. 3A, 3B and 4.

Figures 3A, 3B:
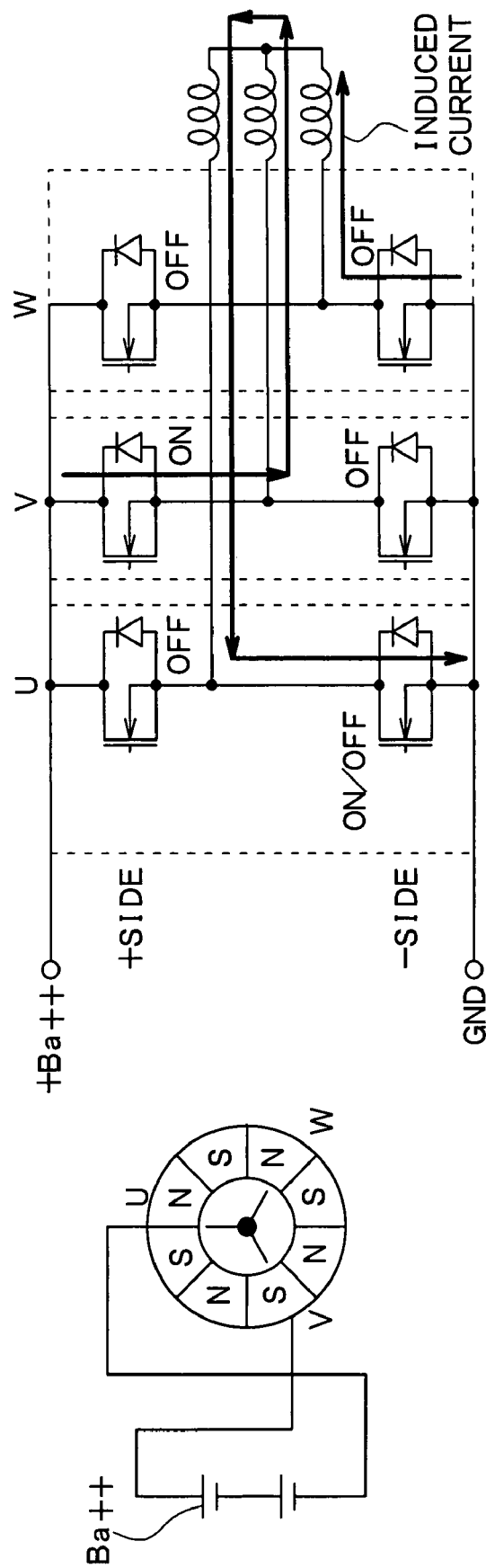
FIGS. 3A and 3B are circuit diagrams showing a drive circuit for one of a first electrical motor and a second electrical motor serving as brushless electrical motors.

FIGS. 3A and 3B are circuit diagrams showing a drive circuit for one of the first and second motors 11 and 12 serving as brushless electrical motors. FIG. 4 is a timing chart showing a way of operation of the first and second motors 11 and 12.

As shown in FIG. 3A, each of the first and second motors 11 and 12 is a three-phase, eight-pole brushless motor having a U-phase, a V-phase, and a W-phase. The brushless motor is driven by a current from an electrical power source. As shown in FIG. 3B, the coils in the three phases of the brushless motor are connected with each other at their one ends. Each of the other ends of the coils is connected with an intermediate point between a plus-side MOS transistor and a minus-side MOS transistor which are a pair of MOS transistors connected in series with each other with the plus-side MOS transistor at the high side of the minus-side MOS transistor.

Three pick-up type sensors for detecting polarity of magnets are located respectively at places close to the three phases. The ways of the rotations of the motors 11 and 12 can be monitored based on signals Su, Sv, and Sw respectively from the three sensors.

Figure 4:
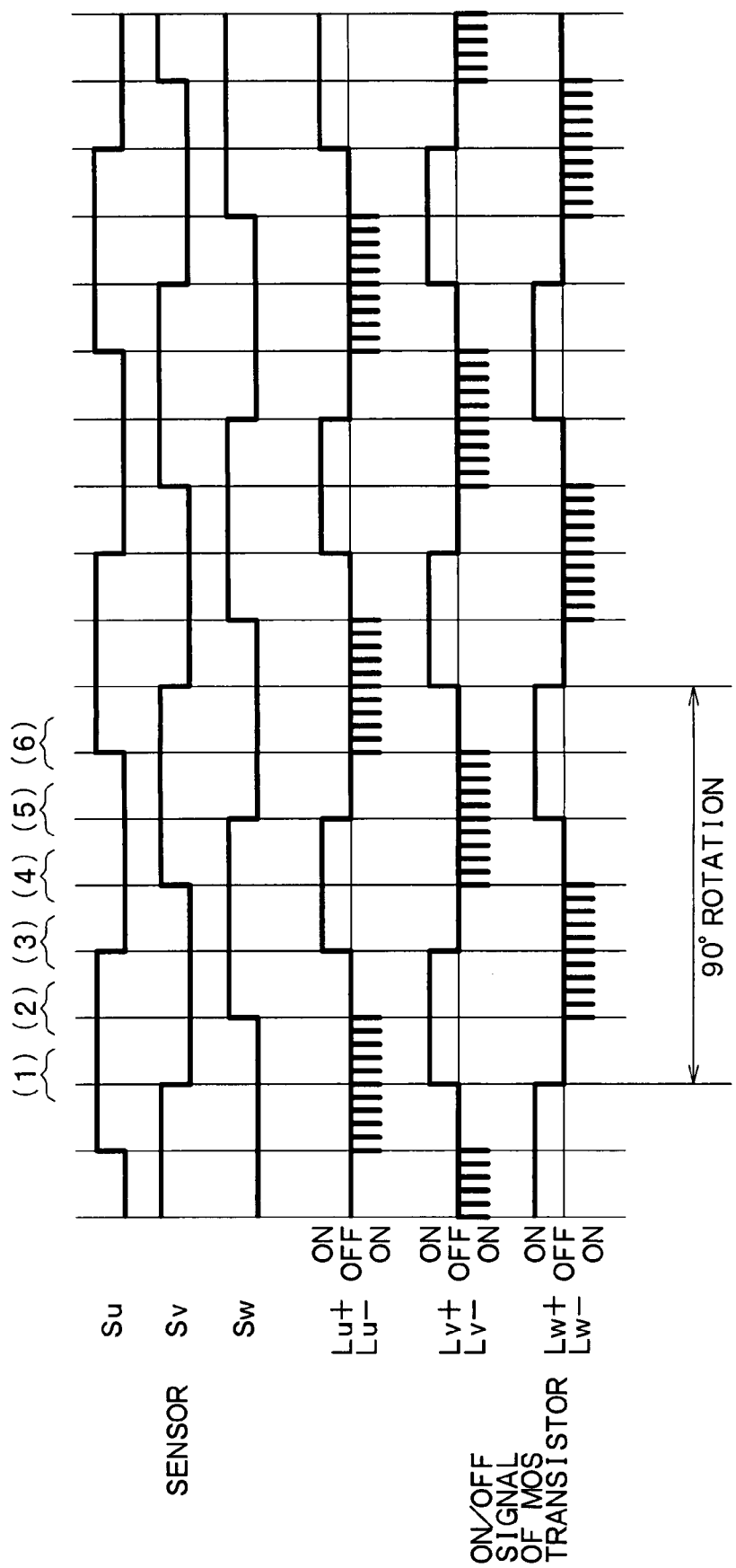
FIG. 4 is a timing chart showing a way of operation of the first and second electrical motors.

The motors 11 and 12 are driven in a manner shown in FIG. 4 in which operation in a period including first to sixth intervals (1) to (6) is repeated. In the period, the motors 11 and 12 are rotated by 90 degrees. In FIG. 4, Lu+, Lv+, and Lw+ indicate ON/OFF statuses of the plus-side MOS transistors at U-phase, V-phase, and W-phase, respectively. Lu−, Lv−, and Lw− indicate ON/OFF statuses of the minus-side MOS transistors at U-phase, V-phase, and W-phase, respectively. The plus-side MOS transistors are kept at ON or OFF for a relatively long period while the minus-side MOS transistors are under a duty control. Under the duty control, a MOS transistor is rapidly switched between the ON state and the OFF state with a certain duty factor. Thus, the current values of currents to the first and second motors 11 and 12 are controlled.

In the first interval (1), the plus-side MOS transistors for the U-phase and the W-phase and the minus-side MOS transistors for the V-phase and the W-phase are turned to or kept at the OFF state, while the plus-side MOS transistor for the V-phase is turned to the ON state and the minus-side MOS transistor for the U-phase is under the duty control. The arrows in FIG. 3B show how the current flows at the first interval (1). As shown in the drawings, the current goes through the coil for the V-phase and the coil for the U-phase in this order. The first and second motors 11 and 12 are accordingly rotated by an angle corresponding to the current.

In the second interval (2), the plus-side MOS transistors for the U-phase and the W-phase and the minus-side MOS transistors for the U-phase and the V-phase are turned to or kept at the OFF state, while the plus-side MOS transistor for the V-phase is kept to the ON state and the minus-side MOS transistor for the W-phase is under the duty control. A current goes through the coil for the V-phase and the coil for the W-phase in this order. The first and second motors 11 and 12 are accordingly rotated by an angle corresponding to the current.

In each of the third to sixth intervals (3) to (6), the ON/OFF statuses of the plus-side MOS transistors and the minus-side MOS transistors for the three phases are controlled as shown in FIG. 4. The first and second motors 11 and 12 are accordingly rotated. While the operation in the first to sixth intervals (1) to (6) are repeated, the first and second motors 11 and 12 are rotated and the rotational speeds of the motors 11 and 12 are adjusted based on the duty factor corresponding to the duty control of the minus-side MOS transistors.

When it is detected that the vehicle is traveling on the sudden change road while in the operation described above, changes in the duty factors for the minus-side MOS transistors sometimes are not enough for the difference between the target rotational speeds suitable for the high friction section and the target rotational speeds suitable for the low friction section.

Therefore in this case, the motor output adjusting portion 100i executes the motor brake control in which the portion 100i decelerates the rotations of the motors 11 and 12 by turning all of the plus-side MOS transistors to the OFF states as well as turning all of the minus-side MOS transistors to the ON states. When all of the plus-side MOS transistors are turned to the OFF states, the current to the motors 11 and 12 are cut off. When all of the minus-side MOS transistors are turned to the ON state, the currents supplied to the motors 11 and 12 escape entirely to the ground.

Figure 5:
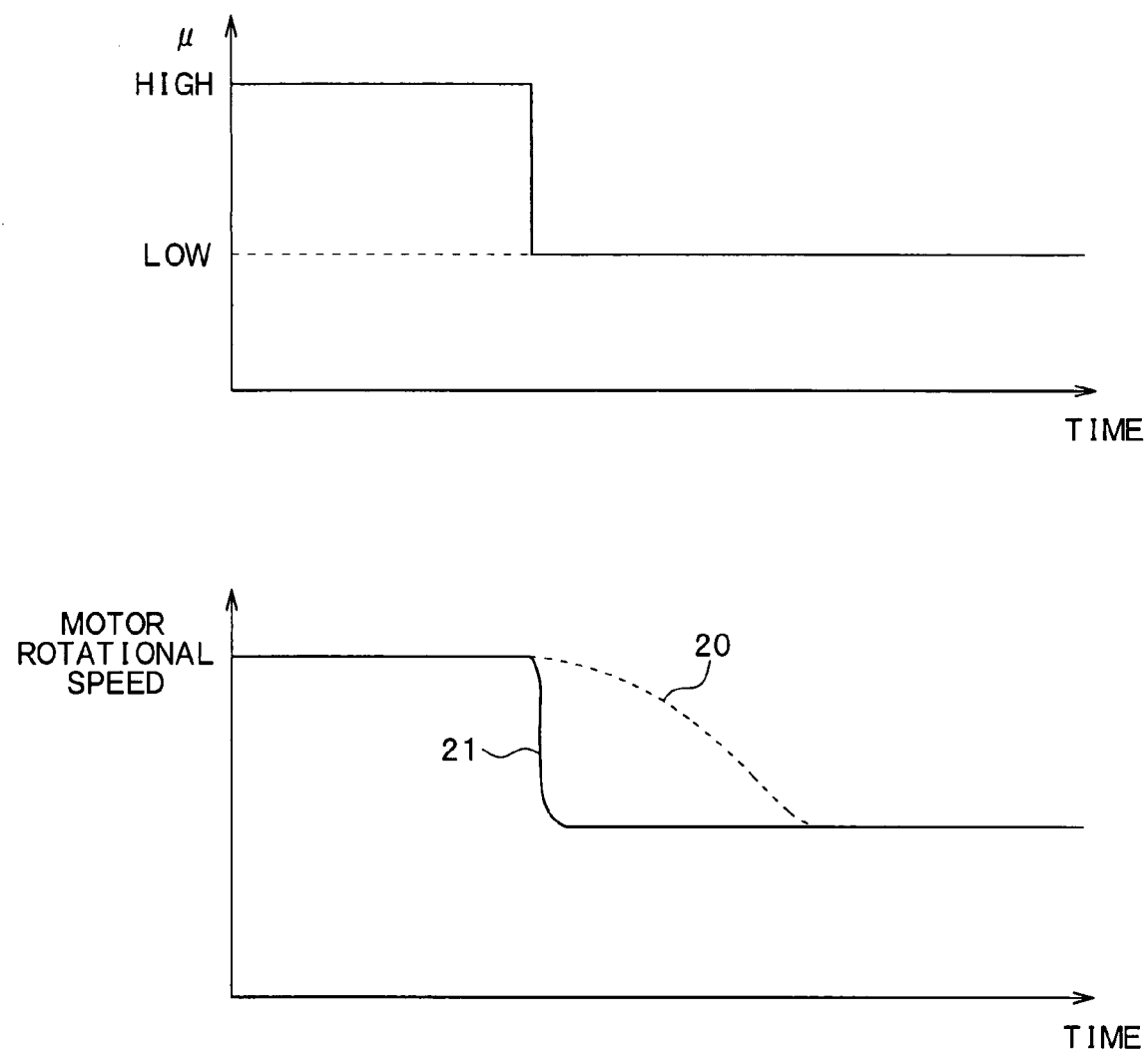
FIG. 5 is a timing chart showing how a friction coefficient μ and the rotational speeds of the electrical motors change in time.

Therefore, supply of the electrical current to the motors 11 and 12 is stopped immediately. Thus, the currents to the first and second motors 11 and 12 are changed in a manner (hereinafter referred to a first manner) so that the first and second motors 11 and 12 would eventually stop rotating if the portion 100i kept controlling the currents in the first manner for a sufficiently long time. In this way, the rotational speeds of the first and second motors 11 and 12 can be reduced rapidly. For example, as is shown in FIG. 5 where the friction coefficient μ and the rotational speeds of the motors 11 and 12 change in time, adjustment of the current value to the first and second motors 11 and 12 can achieve nothing more than changing the rotational speeds of the motors 11 and 12 gradually along a dashed line 20. However, by means of the motor brake control described above, the rotational speeds of the motors 11 and 12 can be rapidly decreased along a solid line 21.

The motor brake control is continued for several calculation periods in which the target W/C pressures or the like are calculated for several times. When the motor brake control ends, the portion 100i adjusts the currents to be supplied to the motors 11 and 12 so that the current values of the currents correspond to the target rotational speeds which are calculated by the portion 100h and are suitable for the low friction section of the sudden change road. The duration during which the motor brake control is continued can be a predetermined constant period or a variable period changing according to change amounts of the target rotational speeds calculated when the vehicle moves from the high friction section to the low friction section.

It is possible to quickly change the rotational speeds of the motors 11 and 12 to the rotational speed suitable for the low friction section at the time when the motors 11 and 12 start receiving the current again, because the rotational speeds of the 11 and 12 at the time are the rotational speeds after rapid decrease.

The operation of the brake control device during normal braking, in the ABS control process, and in an abnormal situation will be described below separately.

FIG. 6 is a table showing the operating states of portions of the vehicle brake control device during the normal braking and in the abnormal situation. The brake ECU 100 determines, by executing a conventional initial check or the like, whether or not the abnormal situation has arose. If the abnormal situation arises, abnormal-state braking operation is executed until the abnormal situation goes away. Hereinafter, the operation during the normal braking, in ABS operation, and in the abnormal situation will be described with reference to FIG. 6.

(1) Operation During the Normal Braking

During normal braking, when the brake pedal 1 is depressed and the detection signal from the brake operation amount sensor 2 is inputted to the brake ECU 100, the brake ECU 100 operates the various control valves SCSS, SNO1, SNO2, SWC1, SWC2, SLFR, SLRL, SLFL, SLRR, and the first and second motors 11, 12 such that they are in the operating states shown in FIG. 6.

Electric power to both the first and second normally-open valves SNO1 and SNO2 is turned to ON, and electric power to both the first and second normally-closed valves SWC1 and SWC2 is turned to ON. Therefore, the first and second normally-open valves SNO1 and SNO2 are both put into a closed state, and the first and second normally-closed valves SWC1 and SWC2 are both put into an open state.

The ON/OFF switching of electric power to the first to fourth linear valves SLFR, SLRL, SLFL, SLRR is subject to duty control (or PWM control) under which the amount of electric power supplied per unit time to the linear valves is controlled in such a way that the pressure differences between the upstream and downstream sides of the linear valves are controlled linearly. Electric power to the stroke control valve SCSS is turned to ON, causing the stroke simulator 4 to be connected with the secondary chamber 3b through the brake conduits B and D. In this case, the brake fluid in the secondary chamber 3b moves to the stroke simulator 4 when the brake pedal is depressed and the pistons 3c and 3d move. Therefore, when the driver depresses the pedal, 1, a reaction force corresponding to an amount of the depression is generated. The brake pedal 1 can hence be depressed without making the driver feel that depressing the brake pedal 1 becomes like pressing a hard board (i.e. giving a board feeling) as a result of the increase in the master cylinder pressure.

In addition, power supply to the first and second motors 11 and 12 is turned to ON and the pumps 7 to 10 draws in and discharges the brake fluid. In this manner, the brake fluid is supplied to the W/Cs 6FR to 6RR when the pumps 7 to 10 perform pumping operation.

Since the first and second normally-open valves SNO1 and SNO2 are in a closed state at this time, the brake fluid pressures downstream of the pumps 7 to 10, that is, the W/C pressures of the W/Cs 6FR to 6RR, are increased. Since the first and second normally-closed valves SWC1 and SWC2 are in an open state and the average amount of electric energy supplied per unit time to the first to fourth linear valves SLFR, SLRL, SLFL, and SLRR are subject to duty control, the W/C pressures of the W/Cs 6FR to 6RR are adjusted according to duty factors of the current value for the linear valves SLFR, SLRL, SLFL, and SLRR.

The brake ECU 100 monitors the W/C pressures in the W/Cs 6FR to 6RR based on the detection signals from the pressure sensors 13 to 16. The brake ECU 100 accordingly adjusts the W/C pressures to desired values by adjusting the amounts of electric power supplied to the first and second motors 11 and 12 to control the revolution speeds thereof and by controlling the ON/OFF duty ratios for the electric power that is supplied to the first to fourth linear valves SLFR, SLRL, SLFL, and SLRR.

Thus, braking force is generated according to the amount of operation performed to the brake pedal 1.

(2) Operation in the ABS Control Process

When the ABS controlling portion 100d determines to start the ABS control process, it determines operation modes respectively for the W/Cs 6FR, 6RL, 6FL, and 6RR. Each of the operation modes is selected from modes for increasing, maintaining, and increasing a corresponding W/C pressure. The control valves are driven according to the determined operation modes. At this time, the control valves operate basically in the manner shown in FIG. 6. The motor output adjusting portion 100i and the linear valve output adjusting portion 100j accordingly adjust current values of the currents to the first motor 11, the second motor 12, and first to fourth linear valves SLFR, SLRL, SLFL, SLRR in order to increase, maintain, and decrease the W/C pressures.

For example, in decreasing the W/C pressure of the W/C corresponding to a wheel under control of the ABS control process, the current value of the current to be supplied to corresponding one of first to fourth linear valves SLFR, SLRL, SLFL, SLRR is decreased so that the differential pressure at the corresponding linear valve has a value smaller than that before decreasing the W/C pressure. In maintaining the W/C pressure of the W/C corresponding to the wheel under control of the ABS control process, the current value of the current to be supplied to the corresponding linear valve is maintained (for example, kept constant) so that the differential pressure at the corresponding linear valve is maintained (for example, kept constant). In increasing the W/C pressure of the W/C corresponding to a wheel under control of the ABS control process, the current value of the current to be supplied to the corresponding linear valve is increased so that the differential pressure at the corresponding linear valve has a value larger than that before increasing the W/C pressure.

Thus, the current values to the first to fourth linear valves SLFR to SLRR are adjusted so that the ABS control process works properly.

In the ABS control process, the vehicle brake control device of the present embodiment controls the rotational speeds of the first and second motors 11 and 12 in a method, which will be described in the case that the ABS process operates while the vehicle having the vehicle brake control device is moving from the high friction section to the low friction section of the sudden change road.

Figure 11:
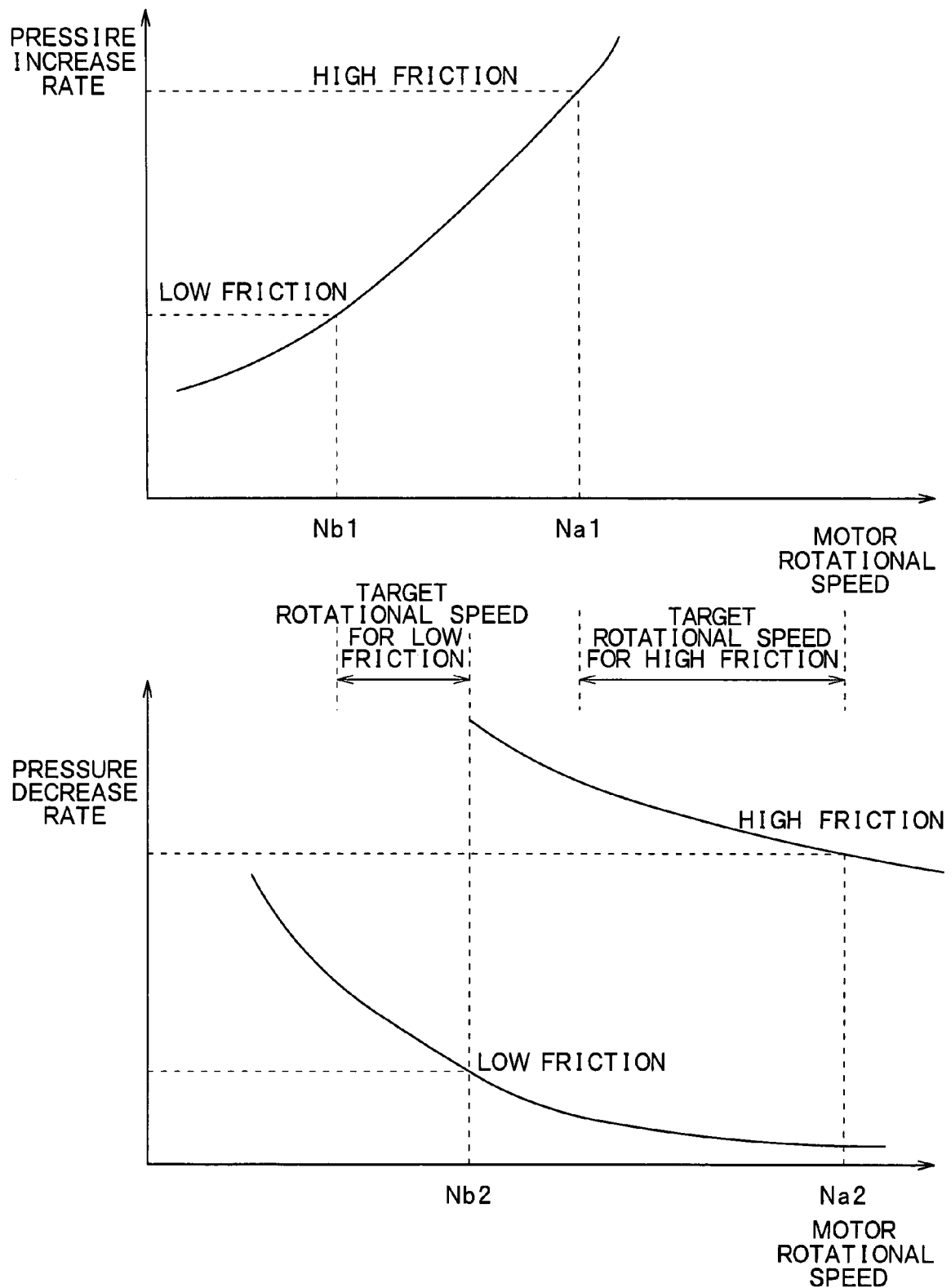
FIG. 11 are graphs showing a relation in ABS control between a pressure increase rate and a target rotational speed of an electrical motor and a relation in ABS control between a pressure decrease rate and a target rotational speed of the electrical motor.

As shown in FIG. 11, a higher pressure increase rate is required at a high friction road with a high friction coefficient μ. Therefore, it is desired at the high friction road that a motor achieves a high rotational speed which is equal to or more than a rotational speed Na1 in FIG. 11 and accordingly satisfies the required pressure increase rate. On the other hand, a high pressure decrease rate is required at the high friction road because it is necessary to decrease the W/C pressure rapidly from a high pressure when the slip ratio is large. The high pressure decrease rate puts an upper limit (a rotational speed Na2 in FIG. 11) to the rotational speed of the motor. It is therefore desirable to adjust the rotational speed of the motor at the high friction road so that the adjusted rotational speed is within a range between the rotational speed Na1 and the rotational speed Na2.

At a low friction road where a friction coefficient μ is lower, the pressure increase speed is not required to be as high as at the high friction road. Therefore, it is desirable that the rotational speed of the motor is equal to or more than a rotational speed Nb1 in FIG. 11 and accordingly satisfies the low pressure increase rate. When the slip ratio is high at the low friction road, the W/C pressure is decreased from a low pressure. However, the high pressure decrease rate is still required because the decrease rate of the W/C pressure should be high enough. The high pressure decrease rate puts an upper limit (a rotational speed Nb2 in FIG. 11) to the rotational speed of the motor. It is therefore desirable to adjust the rotational speed of the motor at the high friction road so that the adjusted rotational speed is within a range between the rotational speed Nb1 and the rotational speed Nb2.

Thus, the target rotational speeds for the high friction road are determined to be within the range between the rotational speed Na1 and the rotational speed Na2, while the target rotational speeds for the low friction road are determined to be within the range between the rotational speed Nb1 and the rotational speed Nb2, wherein "within a range between A and B" means "equal to or larger than A and equal to or smaller than B." However, if the vehicle is traveling on the sudden change road, it is impossible in a conventional manner to change the rotational speeds of the motors immediately from the rotational speeds suitable for the high friction road and the rotational speeds suitable for the low friction road, because the rotational speeds suitable for the high friction road significantly differ from the rotational speeds suitable for the low friction road.

The motor output adjusting portion 100$i$ of the present embodiment determines whether the vehicle is traveling on the sudden change road based on the change amount of the target rotational speeds calculated by the motor rotational speed calculating portion 100$h$ and controls, as described above, the currents for the first and second motors 11 and 12 in a manner so that the first and second motors 11 and 12 would eventually stop rotating if the portion 100$i$ kept controlling the currents in the first manner for a sufficiently long time. Thus, it is possible to change the rotational speeds of the motors 11 and 12 from the rotational speeds suitable for the high friction section to the rotational speeds suitable for the low friction section. Therefore, it is possible to achieve a sufficient deceleration in the ABS control even if the vehicle is traveling on the sudden change road. As a consequence, the vehicle brake control device of the present embodiment executes the suitable ABS control.

(3) Abnormal-State Braking Operation

When an abnormal situation or a failure arises in the vehicle brake control device, there is a possibility that control signals cannot be outputted from the brake ECU 100, or that some of the control valves SCSS, SNO1, SNO2, SWC1, SWC2, SLFR, SLRL, SLFL, SLRR or the first and second motors 11, 12 do not operate properly. In this case, electric power to the various control valves SCSS, SNO1, SNO2, SWC1, SWC2, SLFR, SLRL, SLFL, SLRR and the first and second motors 11, 12 is turned to OFF as shown in FIG. 6.

Since the electric power to both the first and second normally-open valves SNO1 and SNO2 is turned to OFF, both valves SNO1 and SNO2 are in the open states. Since the electric power to both the first and second normally-closed valves SWC1 and SWC2 is turned to OFF, both valves SWC1 and SWC2 are in the closed states.

Since the electric power to all of the first to fourth linear valves SLFR, SLRL, SLFL, and SLRR is turned to OFF, they are in the open states. Since electric power to the stroke control valve SCSS is also turned to OFF, the stroke simulator 4 and the secondary chamber 3$b$ are cut off from each other.

Since the electric power to the first and second motors 11 and 12 is turned to OFF, the pumps 7 to 10 stop drawing in and discharging the brake fluid.

At this time, the primary chamber 3$a$ of the M/C 3 is in a state in which it is connected with the W/C 6FR in the right front wheel FR via the brake conduits A, E, and G1, and the secondary chamber 3$b$ is in a state in which it is connected with the W/C 6FL in the left front wheel FL via the brake conduits B, F, and G3.

Therefore, if the brake pedal 1 is depressed and the push rod or the like is pushed according to the applied depression force, the M/C pressure is generated in the primary chamber 3$a$ and the secondary chamber 3$b$ and the M/C pressure is transmitted to the W/Cs 6FR and 6FL. Braking force is thereby generated for both front wheels FR and FL.

In the abnormal-state braking operation described above, the W/C pressures in the W/Cs 6FR and 6FL on the front wheels also takes effect in the brake conduits G1 and G3. However, the check valves 20 and 21 prevent the W/C pressures from bearing on the pumps 7 and 9 and thereby prevent the brake fluid leaking through the pumps 7 and 9. The W/C pressures therefore are not decreased because of leaking of the brake fluid.

As described above, in the vehicle brake control device according to the present embodiment, the motor output adjusting portion 100$i$ determines in the ABS control whether the vehicle is traveling on the sudden change road based on the change amount of target rotational speeds calculated by the motor rotational speed calculating portion 100$h$ and controls, when the sudden change road is detected, the currents for the first and second motors 11 and 12 in a manner so that the first and second motors 11 and 12 would eventually stop rotating if the vehicle brake control device kept controlling the currents in the first manner for a sufficiently long time.

Thus, it is possible to change the rotational speeds of the motors 11 and 12 from the rotational speeds suitable for the high friction section to the rotational speeds suitable for the low friction section. Therefore, it is possible to achieve a sufficient deceleration in the ABS control even if the vehicle is traveling on the sudden change road. As a consequence, the vehicle brake control device of the present embodiment executes the suitable ABS control.

Second Embodiment

Second embodiment of the present invention will be described. In this embodiment, a portion of the configuration of the vehicle brake control device is different from the configuration in the first embodiment, but the overall configuration is basically the same as that in the first embodiment, so only the parts which are different from the first embodiment will be described.

Figure 7:
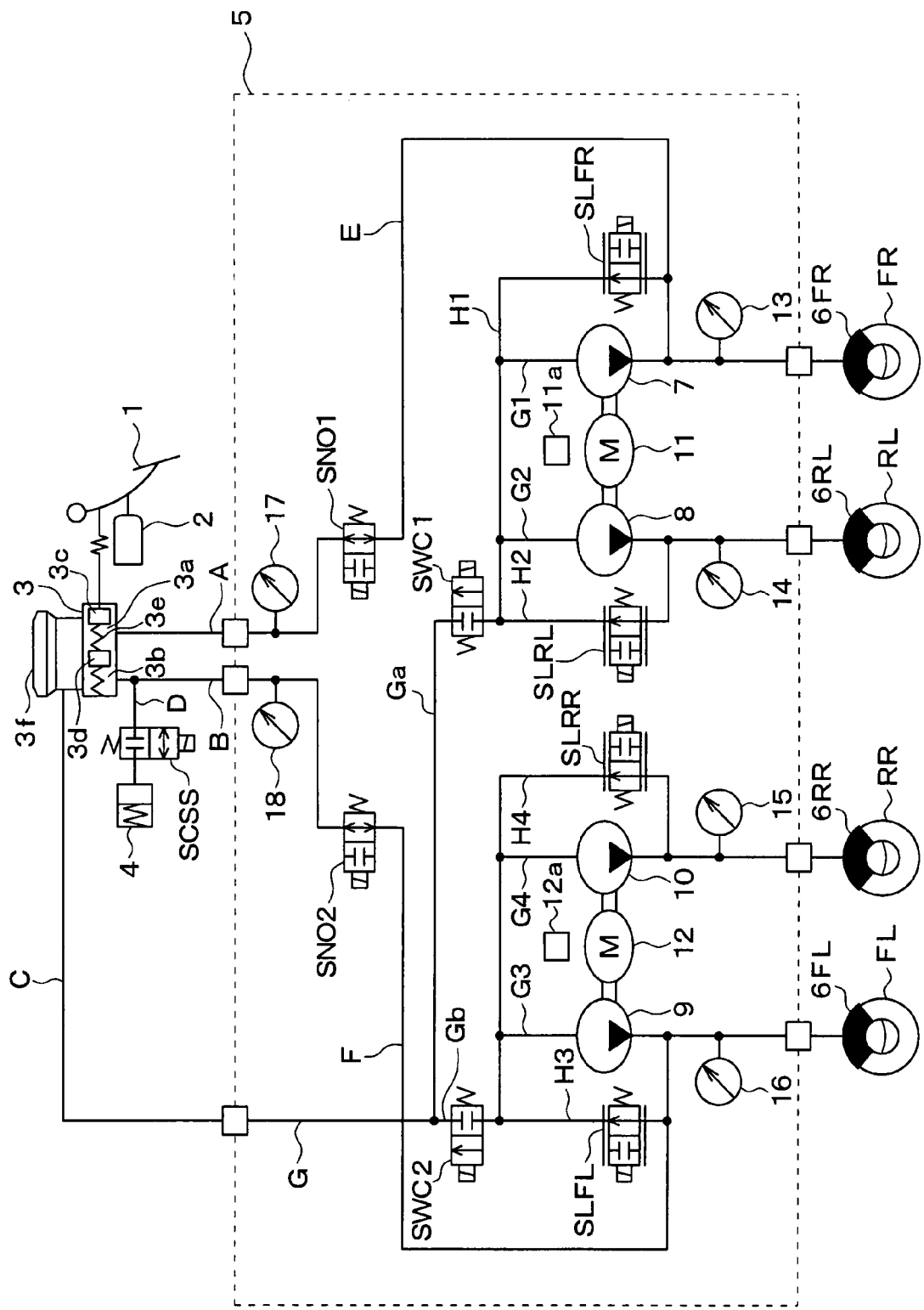
FIG. 7 is a diagram showing a hydraulic circuit configuration of a vehicle brake control device according to a second embodiment of the present invention.

FIG. 7 is a diagram showing a hydraulic circuit configuration of a vehicle brake control device according to this embodiment. As shown in FIG. 7, in the vehicle brake control device in this embodiment, the brake conduit G is divided into two brake conduits Ga and Gb. The first normally-closed valve SWC1 is located in the brake conduit Ga (that is, downstream of the dividing point of the conduits Ga and Gb and upstream of the brake conduits H1 and H2). The second normally-closed valve SWC2 is located in the brake conduit Gb (that is, downstream of the dividing point and upstream of the brake conduits H3 and H4).

The vehicle control device with the structure described above achieves the same effect as that of the first embodiment, if it makes a determination as to whether the vehicle is on the sudden change road based on the change amount of the target rotational speeds determined by the motor rotational speed calculating portion 100$h$ and controls, when the determination is affirmative, the currents to be supplied to the first and second motors 11 and 12 in a manner so that the first and second motors 11 and 12 would eventually stop rotating if the vehicle brake control device kept controlling the currents in the first manner for a sufficiently long time.

In this configuration, even if the first normally-closed valve SWC1 is closed when an abnormality occurs, only the portion of the system on the upstream side of the brake conduits H1 and H2 is closed. Therefore, if the M/C pressure is generated in the primary chamber 3$a$ of the M/C 3 because of depressing of a brake pedal 1, the M/C pressure can be transmitted not only to the W/C 6FR for the right front wheel FR, but also to the W/C 6RL for the left rear wheel RL. Likewise, even if the second normally-closed valve SWC2 is closed when an abnormality occurs, only the portion of the system on the upstream side of the brake conduits H3 and H4 is closed. Therefore, if the M/C pressure is generated in the secondary chamber 3$b$ of the M/C 3 because of depressing of the brake pedal 1, the M/C pressure can be transmitted not only to the W/C 6FL for the left front wheel FL, but also to the W/C 6RR for the right rear wheel RR.

Thus, in the vehicle brake control device in this embodiment, it is possible to generate the W/C pressures in the W/Cs 6FR to 6RR for all four wheels FR to RR in the abnormal situation. Better balanced braking forces can therefore be generated.

In this embodiment, check valves 20 and 21, which were shown in the first embodiment, are not provided. However, the first and second normally-closed valves SWC1 and SWC2, which are located upstream of the pumps 7 and 9, can stop the brake fluid so that no drop occurs in the W/C pressures even if the brake fluid leaks from pumps 7 and 9.

Third Embodiments

Third embodiment of the present invention will be described. In this embodiment, a portion of the configuration of the vehicle brake control device is different from the configuration in the second embodiment, but the overall configuration is basically the same as that in the second embodiment, so only the parts which are different from the second embodiment will be described.

Figure 8:
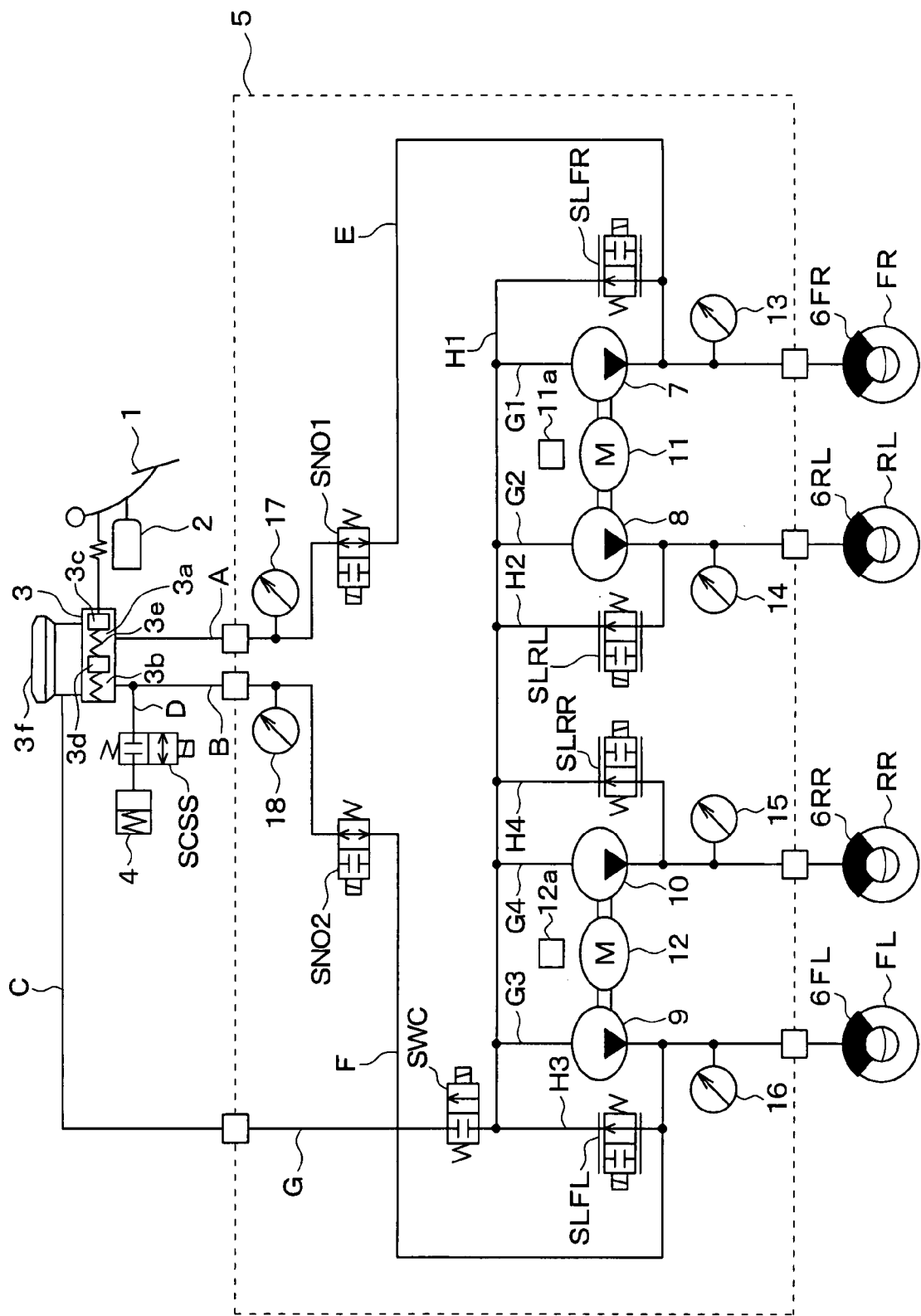
FIG. 8 is a diagram showing a hydraulic circuit configuration of a vehicle brake control device according to a third embodiment of the present invention.

FIG. 8 is a diagram showing a hydraulic circuit configuration of a vehicle brake control device according to this embodiment. As shown in FIG. 8, in the vehicle brake control device in this embodiment, the two conduit systems share a single normally-closed valve SWC, instead of the first and second normally-closed valves SWC1 and SWC2 provided in the first and second embodiments.

The vehicle control device with the structure described above achieves the same effect as that of the first embodiment, if it makes a determination as to whether the vehicle is on the sudden change road based on the change amount of the target rotational speeds determined by the motor rotational speed calculating portion 100h and controls, when the determination is affirmative, the currents to be supplied to the first and second motors 11 and 12 in a manner so that the first and second motors 11 and 12 would eventually stop rotating if the vehicle brake control device kept controlling the currents in the first manner for a sufficiently long time.

Even in this configuration, during the normal braking, W/C pressures in the W/Cs 6FR to 6RR for the four wheels FR to RR can be adjusted appropriately, and when an abnormality occurs, the M/C pressure that is generated in the M/C 3 according to depressing of a brake pedal 1 can be transmitted to the W/Cs 6FR to 6RR for the four wheels FR to RR.

In addition, the single normally-closed valve SWC is closed in the abnormal situation. The M/C pressure is accordingly transmitted to all wheels FR to RR in the two conduit systems. Therefore, it is possible to make the system configuration more compact.

In the vehicle brake control device in this embodiment, the way for driving the normally-closed valve SWC is the same as that for driving the first and second normally-closed valves SWC1 and SWC2 in the vehicle brake control device according to the first embodiment, as shown in FIG. 6.

Other Embodiments

In the above embodiments, a motor control portion includes the motor rotational speed calculating portion 100h and the motor output adjusting portion 100i, wherein the portion 100h calculates the target rotational speeds and the portion 100i in turn detects the sudden change road based on the change amounts of the target rotational speeds. However, the vehicle brake control device is not limited to this operation. The vehicle brake control device may detect the sudden change road in other ways. For example, the portion 100h may detect the sudden change road and calculate target rotational speeds suitable for the sudden change road when the sudden change road is detected.

For example, the portion 100i may directly receive the results of the calculations of the friction coefficient estimating portion 100e, determine whether the vehicle is on the sudden change road, and control the currents to be supplied to the motors 11 and 12 on detecting the sudden change road so that the motors 11 and 12 stop rotating.

The portion 100h may determine whether the vehicle is on the sudden change road based on the results of the calculations of portion 100e, or based on the results of the calculation of the pressure increase rate calculating unit 100f and the pressure decrease rate calculating unit 100g and cause the target rotational speeds of the motors 11 and 12 to be zero on detecting the sudden change road.

The motor control portion achieves the effect of the above first to three embodiments if the one of the portions 100h and 100i detects the sudden change road and the motor control portion controls the currents for the motors 11 and 12 in accordance with the detection of the sudden change road.

In the above embodiments, when the sudden change road is detected, the currents for the first and second motors 11 and 12 are controlled in the motor brake control in the first manner so that the first and second motors 11 and 12 would eventually stop rotating if the vehicle brake control device kept controlling the currents in the first manner for a sufficiently long time. However, the first and second motors 11 and 12 may be controlled in the motor brake control in another manner (hereinafter referred to as a second manner) so that the first and second motors 11 and 12 would eventually start and keep rotating in a reverse direction if the motor controlling portion kept controlling the currents in the second manner for a sufficiently long time.

In the above embodiment, the motor control portion executes the motor brake control when it detects the sudden change road beneath the vehicle based on the result of the calculations of the friction coefficient estimating portion 100e. However, the motor control portion may execute the motor brake control directly based on the slip ratios calculated by the slip ratio calculating portion 100c.

For example, the motor brake control may be executed in any case of that one or more of the slip ratios becomes larger than a threshold slip ratio, that one or more of the change rates of the slip ratios becomes larger than a threshold rate, and that one or more of the slip ratios changes from a ratio below a threshold ratio to a ratio above a threshold ratio quickly, that is, within several calculation periods in which the slip ratios are calculated for several times.

The motor brake control based on the slip ratios can be executed in cases other than that the vehicle moves from the high fiction section to the low friction section of the sudden change road. For example, when the vehicle moves from a snowy road to an icy road, that is, when the vehicle moves from a low friction road to a further low friction road a friction coefficient of which is lower than that on the low friction road, the motor brake control is desired. Since the change of the surface of a road can be detected based on the slip ratios, the motor brake control based on one ore more of the slip ratios is useful.

The vehicle brake control device shown in FIG. 1 is merely an example of the present invention. The vehicle brake control device of the present invention is not limited by that shown in FIG. 1, but may be modified in a variety of ways.

For example, in the first embodiment, examples were explained of vehicle brake control devices applied to a vehicle in which conduit systems include hydraulic circuits in an X conduit arrangement, with a conduit system connecting the left front and right rear wheels and another conduit system connecting the right front and left rear wheels. However, the present invention may also be applied to other systems, such as a front-and-rear conduit arrangement or the like.

Figure 9:
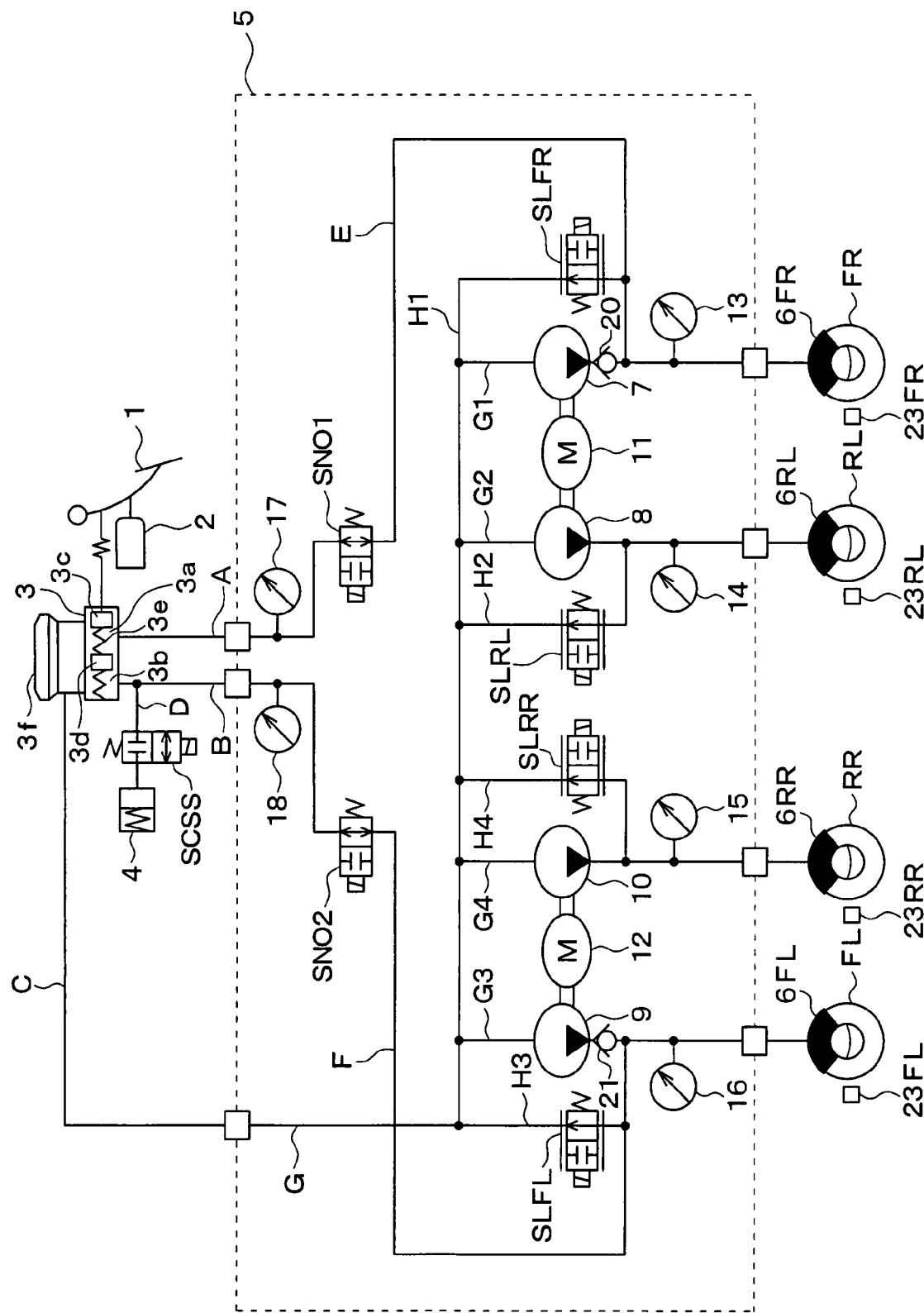
FIG. 9 is a diagram showing a hydraulic circuit configuration of a vehicle brake control device according to another embodiment of the present invention.

In the above embodiments, the brake fluid is supplied to both the first conduit system and the second conduit system through the brake conduit C which is the only conduit connected with the master reservoir 3f. However, as shown in FIG. 9, supplemental brake conduit other than the brake conduit C connected may be provided. In this case, the brake fluid may be supplied to the first conduit system through the brake conduit C and to the second conduit system through the supplemental brake conduit.

In the above embodiments, the M/C 3 is connected with the first conduit system and the second conduit system in case of the abnormal situation in which the first to four pumps 7 to 10 cannot generate pressure. In addition, in the above embodiments, the brake fluid is supplied from the master reservoir 3f during the normal braking. However, the operation is merely an example of the present invention. The M/C 3 may be separated from the first conduit system and the second conduit system. The M/C 3 may be disused. The brake fluid may be supplied not from the master reservoir 3f but from another reservoir which can store the brake fluid.

Also, in the preceding embodiments, even if the first to fourth linear valves SLFL to SLRR do not operate, the M/C pressure that is generated mechanically based on depressing of the brake pedal 1 is transmitted to the W/Cs 6FL, 6FR and the like in consideration of the need for fail-safe operation. However, if a location where an abnormality occurs is somewhere other than the first to fourth linear valves SLFR to SLRR, the first to fourth linear valves SLFR to SLRR can operate. So if electric power can be supplied to the first to fourth linear valves SLFR to SLRR so that the brake conduits H1 to H4 are closed (or, so that a pressure difference between an upstream and an downstream of each of the brake conduits H1 to H4 is maximized), it would be possible to transmit the M/C pressure to the W/Cs 6FL, 6FR and the like in the same manner as described above. Therefore, it is not necessarily the case that the first and second normally-closed valves SWC1, SWC2 or the single normally-closed valve SWC must be provided. As shown in the hydraulic circuit configuration shown in FIG. 9, a structure may also be used that is not provided with the first and second normally-closed valves SWC1, SWC2 or with the single normally-closed valve SWC.

However, in the sense that all fail-safe operations must be able to be executed mechanically, the first and second normally-closed valves SWC1 and SWC2 and the single normally-closed valve SWC are important.

Figure 10:
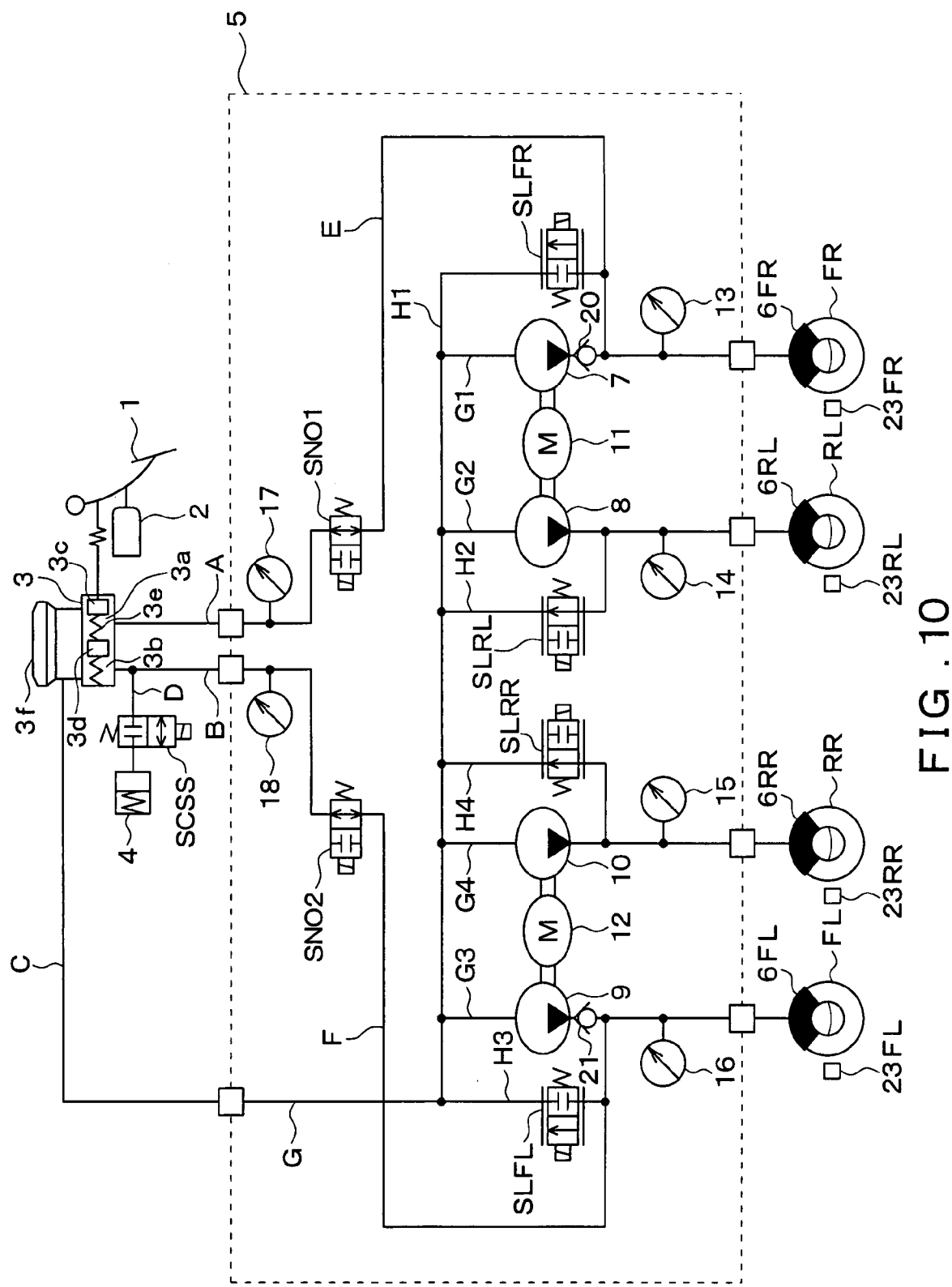
FIG. 10 is a diagram showing a hydraulic circuit configuration of a vehicle brake control device according to still another embodiment of the present invention.

Therefore, as shown in the hydraulic circuit configuration shown in FIG. 10, it is more preferable if the first linear valve SLFR and the third linear valve SLFL are configured as normally-closed linear valves, because the fail-safe operation can be executed mechanically. Of course, the second linear valve SLRL and the fourth linear valve SLRR may also be configured as normally-closed linear valves.

In the above embodiments, the brake pedal 1 serves as an example of a brake operating member. However, a brake lever and the like may serve as and example of the brake operating member.

What is claimed is:

1. A brake control device for a vehicle, comprising:
a brake operating member to be operated by a driver;
an operation amount sensor for detecting an operation amount of the brake operating member;
a first and a second front wheel cylinder, which are respectively installed to two front wheels;
a first and a second rear wheel cylinder, which are respectively installed to two rear wheels;
a reservoir for storing brake fluid;
a main conduit for connecting the first and second front wheel cylinders and the first and second rear wheel cylinders with the reservoir, the main conduit branching into four sections which are respectively connected with the first and second front wheel cylinders and the first and second rear wheel cylinders;
a first pump located in a first one of the four sections, the first pump for pressurizing a first one of the first front wheel cylinder, the second front wheel cylinder, the first rear wheel cylinder, and the second rear wheel cylinder by drawing in and discharging the brake fluid stored in the reservoir;
a second pump located in a second one of the four sections, the second pump for pressurizing a second one of the first front wheel cylinder, the second front wheel cylinder, the first rear wheel cylinder, and the second rear wheel cylinder by drawing in and discharging the brake fluid stored in the reservoir;
a third pump located in a third one of the four sections, the third pump for pressurizing a third one of the first front wheel cylinder, the second front wheel cylinder, the first rear wheel cylinder, and the second rear wheel cylinder by drawing in and discharging the brake fluid stored in the reservoir;
a fourth pump located in a fourth one of the four sections, the fourth pump for pressurizing a fourth one of the first front wheel cylinder, the second front wheel cylinder, the first rear wheel cylinder, and the second rear wheel cylinder by drawing in and discharging the brake fluid stored in the reservoir;
a first electrical motor for driving the first and second pumps which are provided to a first conduit system of the main conduit and pressurize the first conduit system;
a second electrical motor for driving the third and fourth pumps which are provided to a second conduit system of the main conduit and pressurize the second conduit system;
first to fourth adjustment conduits, which are located respectively in parallel with the first to fourth pumps and return the brake fluid to the reservoir;
first to fourth linear valves, which are respectively located in the first to fourth adjustment conduits; and
a control means for controlling, based on a detection signal from the operation amount sensor, the first to fourth linear valves, the first electrical motor, and the second electrical motor,
wherein the control means includes:
a first calculating portion for calculating target wheel cylinder pressures corresponding to the operation amount detected by the operation amount sensor when the operation amount sensor detects that the brake operating member is operated;
a second calculating portion for calculating slip ratios of the front wheels and the rear wheels;
an ABS control portion for executing an ABS control based on the slip ratios calculated by the second calculating portion;

a friction estimating portion for estimating friction coefficients of sections of a road on which the front wheels and the rear wheels are located, respectively;

a motor control portion for:

determining target rotational speeds of the first and second electrical motors based on the target wheel cylinder pressures calculated by the first calculating portion;

obtaining information as to whether the ABS control is executed from the ABS control portion and information on the friction coefficients from the friction estimating portion;

determining, while the ABS control is executed, the target rotational speeds of the first and second electrical motors based on the friction coefficients; and controlling current values of currents to be supplied to the first and second electrical motors so that the first and second electrical motors rotates at the determined target rotational speeds, wherein the motor control portion:

in the ABS control, detects, based on the obtained information on the friction coefficients from the friction estimating portion, that the vehicle is traveling on a sudden change road in which a friction coefficient changes suddenly from a high value higher than a threshold coefficient to a lower value lower than the threshold coefficient; and performs a motor brake control for controlling, based on the detection of the sudden change road, the currents to be supplied to the first and second electrical motors in a first manner or a second manner in order to change rotational speeds of the first and second electrical motors from high target rotational speeds for a high friction section of the sudden change road having the friction coefficient of the high value to low target rotational speeds for a low friction section of the sudden change road having the friction coefficient of the low value, wherein in the first manner the currents are controlled so that the first and second electrical motors would eventually stop rotating, and in the second manner the currents are controlled so that the first and second electrical motors would eventually start rotating in a reverse direction.

2. The brake control device according to claim 1, wherein the motor control portion determines whether the vehicle is traveling on the sudden change road based on whether at least one of differences between the high target rotational speeds and the low target rotational speeds is larger than a threshold difference.

3. The brake control device according to claim 1, further including:

a third calculating portion for calculating pressure increase rates of wheel cylinder pressures of the wheel cylinders based on the friction coefficients estimated by the friction estimating portion, and a fourth calculating portion for calculating pressure decrease rates of wheel cylinder pressures of the wheel cylinders based on the friction coefficients estimated by the friction estimating portion, wherein the motor control portion:

obtains information on the pressure increase speeds and pressure decrease speeds from the third calculating portion and the fourth calculating portion; and uses the obtained information on the pressure increase speeds and the pressure decrease speeds as the information on the friction coefficients from the friction estimating portion, in determining, while the ABS control is executed, the target rotational speeds of the first and second electrical motors depending on a friction coefficient on which the vehicle is traveling.

4. The brake control device according to claim 1, wherein the motor control portion determines duration of the motor brake control based on the differences between the high target rotational speeds and the low target rotational speeds.

5. A brake control device for a vehicle, comprising:

a brake operating member to be operated by a driver;

an operation amount sensor for detecting an operation amount of the brake operating member;

a first and a second front wheel cylinder, which are respectively installed to two front wheels;

a first and a second rear wheel cylinder, which are respectively installed to two rear wheels;

a reservoir for storing brake fluid;

a main conduit for connecting the first and second front wheel cylinders and the first and second rear wheel cylinders with the reservoir, the main conduit branching into four sections which are respectively connected with the first and second front wheel cylinders and the first and second rear wheel cylinders;

a first pump located in a first one of the four sections, the first pump for pressurizing a first one of the first front wheel cylinder, the second front wheel cylinder, the first rear wheel cylinder, and the second rear wheel cylinder by drawing in and discharging the brake fluid stored in the reservoir;

a second pump located in a second one of the four sections, the second pump for pressurizing a second one of the first front wheel cylinder, the second front wheel cylinder, the first rear wheel cylinder, and the second rear wheel cylinder by drawing in and discharging the brake fluid stored in the reservoir;

a third pump located in a third one of the four sections, the third pump for pressurizing a third one of the first front wheel cylinder, the second front wheel cylinder, the first rear wheel cylinder, and the second rear wheel cylinder by drawing in and discharging the brake fluid stored in the reservoir;

a fourth pump located in a fourth one of the four sections, the fourth pump for pressurizing a fourth one of the first front wheel cylinder, the second front wheel cylinder, the first rear wheel cylinder, and the second rear wheel cylinder by drawing in and discharging the brake fluid stored in the reservoir;

a first electrical motor for driving the first and second pumps which are provided to a first conduit system of the main conduit and pressurize the first conduit system;

a second electrical motor for driving the third and fourth pumps which are provided to a second conduit system of the main conduit and pressurize the second conduit system;

first to fourth adjustment conduits, which are located respectively in parallel with the first to fourth pumps and return the brake fluid to the reservoir;

first to fourth linear valves, which are respectively located in the first to fourth adjustment conduits; and a control means for controlling, based on a detection signal from the operation amount sensor, the first to fourth linear valves, the first electrical motor, and the second electrical motor, wherein the control means includes:

a first calculating portion for calculating target wheel cylinder pressures corresponding to the operation amount detected by the operation amount sensor when the operation amount sensor detects that the brake operating member is operated;

a second calculating portion for calculating slip ratios of the front wheels and the rear wheels;

an ABS control portion for executing an ABS control based on the slip ratios calculated by the second calculating portion;

a motor control portion for:

determining target rotational speeds of the first and second electrical motors based on the target wheel cylinder pressures calculated by the first calculating portion;

obtaining information as to whether the ABS control is executed from the ABS control portion and information on the slip ratios from the second calculating portion;

determining, while the ABS control is executed, the target rotational speeds of the first and second electrical motors based on the slip ratios; and controlling current values of currents to be supplied to the first and second electrical motors so that the first and second electrical motors rotates at the determined target rotational speeds, wherein the motor control portion:

in the ABS control, detects, based on the obtained information on the slip ratios from the second calculating portion, that the vehicle is traveling on a sudden change road; and performs a motor brake control for controlling, based on the detection of the sudden change road, the currents to be supplied to the first and second electrical motors in a first manner or a second manner in order to change rotational speeds of the first and second electrical motors, wherein in the first manner the currents are controlled so that the first and second electrical motors would eventually stop rotating, and in the second manner the currents are controlled so that the first and second electrical motors would eventually start rotating in a reverse direction.

6. The brake control device according to claim 5, wherein the motor control portion executes the motor brake control when at least one of the slip ratios exceeds a threshold slip ratio.

7. The brake control device according to claim 5, wherein the motor control portion executes the motor brake control when at least one of change rates of the slip ratios exceeds a threshold rate.

8. The brake control device according to claim 5, wherein the motor control portion executes the motor brake control when at least one of the slip ratios changes from a ratio below a threshold ratio to a ratio above a threshold ratio quickly.

9. The brake control device according to claim 1, wherein the first electrical motor and the second electrical motor are brushless motors.

10. The brake control device according to claim 5, wherein the first electrical motor and the second electrical motor are brushless motors.

* * * * *